(12) United States Patent
Kennealy

(10) Patent No.: US 7,474,673 B1
(45) Date of Patent: Jan. 6, 2009

(54) RECORDING AND USING TRANSCODING INFORMATION

(75) Inventor: Roger D. Kennealy, Santa Cruz, CA (US)

(73) Assignee: Cisco Technology, Inc., San Jose, CA (US)

(*) Notice: Subject to any disclaimer, the term of this patent is extended or adjusted under 35 U.S.C. 154(b) by 864 days.

(21) Appl. No.: 10/675,158

(22) Filed: Sep. 29, 2003

(51) Int. Cl.
*H04J 3/16* (2006.01)

(52) U.S. Cl. .............. 370/466; 370/352; 370/467; 370/401; 370/468; 370/410; 370/409; 370/394; 370/402; 370/522

(58) Field of Classification Search .......... 370/466, 370/352, 467, 401, 468, 410, 409, 394, 402, 370/522, 338
See application file for complete search history.

(56) References Cited

U.S. PATENT DOCUMENTS

| | | | |
|---|---|---|---|
| 5,438,569 A | 8/1995 | Kapadia et al. | 370/79 |
| 5,526,397 A | 6/1996 | Lohman | 379/58 |
| 5,912,897 A * | 6/1999 | Steinbach | 370/467 |
| 6,047,007 A | 4/2000 | Munday et al. | 370/545 |
| 6,324,409 B1 * | 11/2001 | Shaffer et al. | 455/552.1 |
| 6,385,195 B2 | 5/2002 | Sicher et al. | 370/356 |
| 6,603,774 B1 | 8/2003 | Knappe et al. | 370/466 |
| 7,113,582 B1 * | 9/2006 | Mangal | 379/220.01 |
| 2002/0080791 A1 * | 6/2002 | Sylvain | 370/394 |
| 2003/0048795 A1 * | 3/2003 | Pinault | 370/401 |
| 2004/0131051 A1 * | 7/2004 | Rabipour et al. | 370/352 |

* cited by examiner

*Primary Examiner*—Edan Orgad
*Assistant Examiner*—Wutchung Chu
(74) *Attorney, Agent, or Firm*—Baker Botts L.L.P.

(57) ABSTRACT

A system for providing telecommunication service between users, includes a first network, a second network, a gateway. The first network is capable of communicating media in at least one encoding format. The second network is capable of communicating media in at least one format. In operation, the gateway receives a call setup message from the first network, the call setup message signaling for a media channel for transporting media between a first device and a second device. The gateway identifies a first encoding format for the media communicated with the first network. The gateway also determines a second encoding format for the media in the media channel communicated with the second network. If the first encoding format and the second encoding format are different, the gateway modifies transcoding information in the call setup message, the transcoding information indicating a number of transcoding points on the media channel.

33 Claims, 2 Drawing Sheets

RECORDING AND USING TRANSCODING INFORMATION

TECHNICAL FIELD OF THE INVENTION

This invention relates, in general, to telecommunications and, more particularly, to recording and using transcoding information.

BACKGROUND OF THE INVENTION

Significant improvements in the global telecommunication infrastructure over recent decades have produced a number of interconnected national, multinational, and regional networks able to facilitate telecommunication service between users located essentially anywhere in the world. However, the incremental nature of these improvements has produced a patchwork collection of networks supporting a variety of different communication formats. The process of repeatedly transcoding media between encoding formats as the media travels across several networks can significantly increase the amount of time required for the media to traverse the various networks between caller and recipient and can degrade the quality of communication.

SUMMARY OF THE INVENTION

In accordance with the present invention, techniques for provision of telephony services using call setup messages that include transcoding information are provided.

In accordance with one embodiment of the present invention, a system for providing telecommunication service between a plurality of users includes a first network, a second network, and a gateway. The first network is capable of communicating media in at least one encoding format. The second network is capable of communicating media in at least one encoding format. The gateway is capable of receiving a call setup message from the first network, the call setup message signaling for a media channel for transporting media between a first device and a second device; identifying a first encoding format for the media communicated with the first network; determining a second encoding format for the media communicated with the second network; modifying transcoding information in the call setup message if the first encoding format and the second encoding format are different, the transcoding information indicating a number of transcoding points on the media channel; identifying a remote element to receive the call setup message; and transmitting the call setup message to the remote element.

In accordance with another embodiment of the present invention, a method for signaling to establish telecommunication service between a first network and a second network includes receiving a call setup message from a first network, the call setup message signaling for a media channel for transporting media between a first device and a second device; identifying a first encoding format for the media communicated with the first network; determining a second encoding format for the media communicated with a second network; if the first encoding format and the second encoding format are different, modifying transcoding information in the call setup message, the transcoding information indicating a number of transcoding points on the media channel; identifying a remote element to receive the call setup message; and transmitting the call setup message to the remote element.

Technical advantages of certain embodiments of the present invention include limiting the number of times a message is transcoded during transmission. Other technical advantages of certain embodiments of the present invention include recording the transcoding history of a message as the message is transmitted through the system. Use of these techniques may increase quality of telephony communications, leading to fewer disputes among carriers over voice quality and violations of service level agreements.

Other technical advantages of the present invention will be readily apparent to one skilled in the art from the following figures, descriptions, and claims. Moreover, while specific advantages have been enumerated above, various embodiments may include all, some, or none of the enumerated advantages.

DETAILED DESCRIPTION OF THE INVENTION

Figure 1:
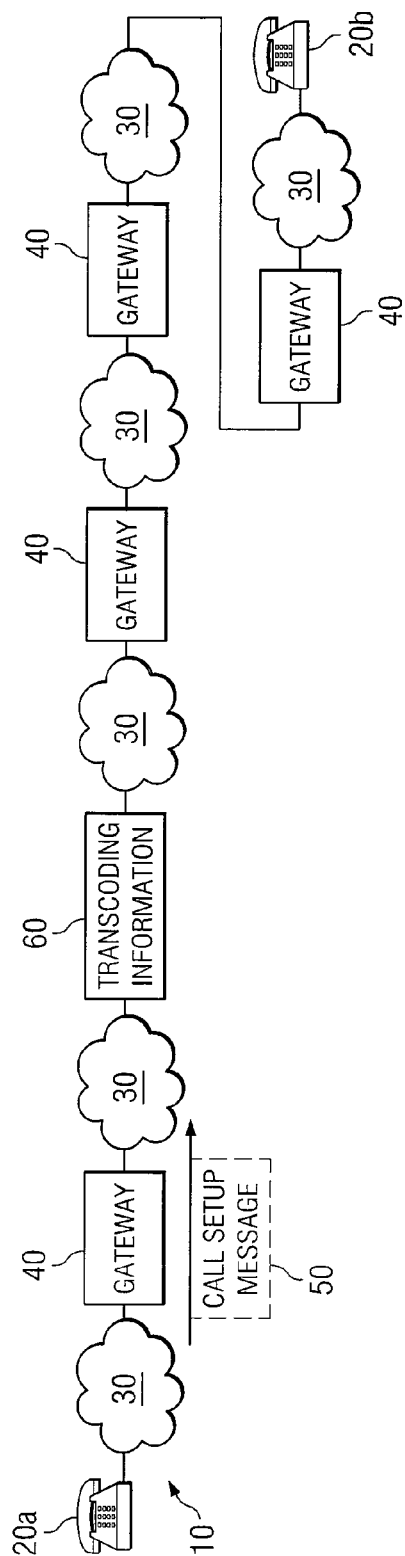
FIG. 1 illustrates a communication system including devices, gateways and networks that provide telephony services according to a particular embodiment of the present invention.

FIG. 1 illustrates a system 10 that provides telecommunication service to users of devices 20. Networks 30 and gateways 40 support telecommunication service by connecting devices 20 coupled to system 10. To setup communications, elements of system 10 may exchange one or more signaling messages. If transmission of the signaling messages is successful, these signaling messages can establish a media channel for subsequent communications between devices 20. In certain circumstances, the media channel may span multiple networks 30. In these circumstances, each gateway 40 may potentially transcode communications between different encoding formats. In particular embodiments, selected signaling messages may track transcoding that will subsequently occur as media is transmitted along the media channel. For example, as a signaling message propagates along a path from one device 20 to another device 20, the message may track the number of points along the path where transcoding will occur.

Devices 20 provide telecommunication service to users of system 10. Devices 20 represent any equipment, including appropriate controlling logic, suitable for providing voice, video, or data communication service to a user. For example, devices 20 may include appropriately enabled phones, computers, facsimile machines, or other suitable devices. Devices 20 include user interface and network interface components allowing devices 20 to interact, respectively, with users and with networks 30. In the illustrated embodiment, system 10 includes a calling device 20a and a called device 20b.

Networks 30 facilitate communication between devices 20 by transmitting information between devices 20 and/or gateways 40. Networks 30 represent telephony infrastructure, including any appropriate hardware and/or software. Networks 30 may include routers, hubs, switches, gateways, or any other suitable components in any suitable form or arrangement. Additionally, networks 30 may also include any combination of public or private communications equipment such as elements of a public switched telephone network (PSTN), a global computer network such as the Internet, a local area network (LAN), a wide area network (WAN), or other appropriate communications equipment. Each network 30 supports call setup according to one or more signaling protocols, such as Session Initiation Protocol, (SIP), H.323, Session Description Protocol (SDP), or any other appropriate protocol, and transmits media in one or more encoding formats, such as G.711, G.729, or any other suitable encoding scheme.

Gateways 40 transfer data between neighboring networks 30 and/or devices 20. Gateways 40 represent any suitable collection and arrangement of hardware and associated logic for coupling to two or more networks 30. Additionally, in communicating data, gateways 40 may serve as "transcoding points," transcoding the data from one encoding format to another. Transcoding may occur as a result of the encoding formats supported by the relevant networks 30, cost considerations, carrier agreements, service quality requirements, or any other suitable factors. For the sake of simplicity, the illustrated embodiment depicts a single gateway 40 linking each pair of neighboring networks 30. In particular embodiments, however, multiple gateways 40 may link a particular network 30 to a neighboring network 30. For example, a first gateway 40 coupled to a first network 30 may connect to a second gateway 40 coupled to a second network 30, thereby connecting first network 30 and second network 30.

During operation, elements of system 10 may exchange one or more signaling messages to set up communications between devices 20. If successful, these signaling messages can establish a media channel for subsequent communications between devices 20. As previously noted, a media channel between two devices 20 may span multiple networks 30. In these circumstances, each gateway 40 may potentially transcode communications between different encoding formats. When a media channel involves multiple transcoding points, this can introduce problems such as signal delay, signal degradation, and lost portions of the communication session.

In particular embodiments, selected signaling messages may track transcoding that will result along a subsequently established channel. For example, as a signaling message propagates along a path from one device 20 to another device 20, the message may track the number of transcoding points along the path. This tracking can help elements of system 10 to identify and potentially respond to characteristics of the path to be established. For example, elements may interact to find a path that limits the number of transcoding points for a media channel.

Consider calling device 20a placing a call to called device 20b. As call setup message 50 propagates along the path, it attempts to track transcoding activity that will occur along the path. For example, call setup message 50 may include transcoding information 60 that indicates the number of times subsequent media will be transcoded. As call setup message 50 propagates along the path between devices 20, each gateway 40 can update this field. For example, if transcoding will occur for subsequent communications passing through the gateway 40, gateway 40 may increment a counter included in transcoding information 60.

Depending on the capabilities of devices 20, various elements of system 10 may create and/or supplement call setup message 50 such that call setup message 50 includes transcoding information 60. Regardless of whether device 20, network 30, gateway 40, or another element generates call setup message 50, the creating component may initialize or otherwise modify transcoding information 60 of call setup message 50. Depending on the configuration and characteristics of system 10, transcoding information 60 may represent one or more bits in call setup message 50, a text file attached to call setup message 50, or data associated with call setup message 50 in any other suitable fashion. The component that creates call setup message 50 may initialize transcoding information 60 in any appropriate manner based on the characteristics of transcoding information 60 or system 10 in general.

Transcoding information 60 may include any appropriate information pertaining to predicted transcoding of the media associated with call setup message 50 as the media traverses the path established by call setup message 50, the encoding formats of the networks 30 on the path, or any other transcoding-related information relevant to the path. For example, transcoding information 60 may include a numeric value that represents the number of transcoding points that will exist along a path established by call setup message 50.

As another example, transcoding information 60 may include a list of the protocols contemplated at each transcoding point. In this case, the component creating call setup message 50 may initialize transcoding information 60 by setting transcoding information 60 to a value identifying the initial encoding format for the media. Then, if gateway 40 determines that transcoding will occur, gateway 40 may append information identifying the format of the media to be transmitted by gateway 40. Thus, at each point along the path, counter 50 will contain a list of all the formats through which the associated media will be transcoded in traveling the path established by call setup message 50.

Returning again to the example above, after generating or receiving call setup message 50, a first network 30, "Network A", identifies a neighboring network 30 to which call setup message 50 should be communicated. Gateway 40 may use conventional routing techniques or any suitable techniques to identify the neighboring network 30 based, at least in part, on the intended destination of call setup message 50. For example, Network A may identify the neighboring network to send call setup message 50 from a list of connection peers maintained by gateway 40. The list of connection peers may include all networks 30 neighboring Network A or any subset of neighboring networks 30 as appropriate based on the configuration and characteristics of the various networks 30 and system 10.

After identifying the next network 30 to receive call setup message 50, Network A communicates call setup message 50 to the particular gateway 40 that connects Network A to the identified network 30. If appropriate, gateway 40 then communicates call setup message 50 to the identified network 30. Network 30 that receives call setup message 50 from Network A similarly identifies, using appropriate techniques, another network 30 to send call setup message 50. Then, the process is repeated until the target device 20 or another appropriate element receives call setup message 50.

Figure 3:
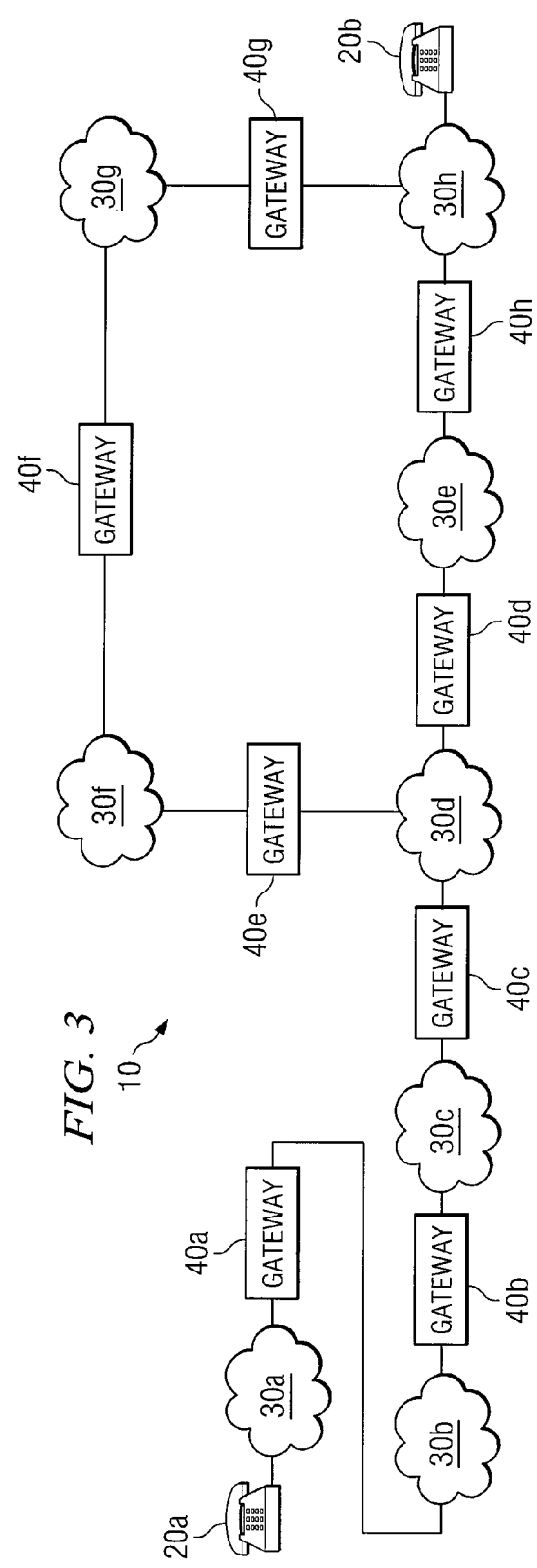
FIG. 3 illustrates the transmission of a message in a particular embodiment of the communication system.

As call setup message 50 establishes a path between calling device 20a and called device 20b, a particular gateway 40 connecting two networks 30 along the path may determine that transcoding of the media associated with call setup message 50 will occur when the media is transmitted across gateway 40. For example, gateway 40 may determine that a first network 30 and a second network 30 do not support any common formats. As another example, gateway 40 may determine that the quality of service will be improved if the media associated with call setup message 50 is transcoded as the media is transmitted between the first and second network 30 coupled to gateway 40. If gateway 40 determines that gateway 40 will transcode the media when the media is transmitted across gateway 40 in following the path established by call setup message 50, gateway 40 modifies transcoding information 60 of call setup message 50. FIG. 3 illustrates an example of system 10 transmitting call setup message 50 in a particular embodiment.

Gateway 40 may be configured to modify transcoding information 60 in various ways. For example, where transcoding information 60 includes a numeric value, each gateway 40 acting as a transcoding point may increment this value. In this case, at any point along the path, transcoding information 60 will contain a count of the number of transcoding points call setup message 50 has passed on the path. For a more detailed description of such an embodiment, see FIG. 3 below.

In other embodiments, transcoding information 60 may document the formats through which the media associated with call setup message 50 will be transcoded while traveling the path. In such an embodiment, if gateway 40 determines transcoding will occur, gateway 40 may append information to transcoding information 60 identifying the format to which gateway 40 will transcode media. Thus, at any point along the path, transcoding information 60 will contain a list of all the formats into which the media will be transcoded in traveling the path established by call setup message 50. In general, transcoding information 60 may document any appropriate information about transcoding that may occur along the path established by call setup message 50 or the encoding formats supported by networks 30 along the path.

Returning again to the example, call setup message 50 eventually reaches an endpoint component responsible for handling the call setup message 50. At this point, the endpoint component attempts to establish a call or otherwise respond to call setup message 50. In various embodiments, endpoint component may represent a variety of different components. In the illustrated embodiment, endpoint component represents called device 20*b*. In other embodiments, endpoint component may represent a particular gateway 40 or network 30 in communication with called device 20*b*, or any other appropriate component. In embodiments where called device 20*b* is not the endpoint component on the path established by call setup message 50, the endpoint component may accept call setup message 50 on behalf of device 20*b* and interact with called device 20*b* as appropriate to facilitate communication between calling device 20*a* and called device 20*b*. For the sake of simplicity, the remainder of this example assumes that called device 20*b* represents the endpoint component as is shown in the illustrated embodiment.

When call setup message 50 reaches the endpoint component, here called device 20*b*, the endpoint component may accept call setup message 50 and, if so, setup a call between calling device 20*a* and called device 20*b*. In setting up the call, called device 20*b* may respond to call setup message 50 by transmitting a call response message or any other suitable response. Once the call between calling device 20*a* and called device 20*b* is set up, calling device 20*a* initiates a media session with called device 20*b*. Media from the media session is transmitted along the path established by call setup message 50 and is transcoded at transcoding points determined during the call.

The information recorded by transcoding information 60 may provide a number of benefits in use by components of system 10 or by service providers operating networks 30 on system 10. For instance, the number of times a particular call message has been transcoded may be used to identify or eliminate transcodings as a cause of poor system performance. Additionally, gateways 40 may be configured to reject a call setup message 50 if gateway 40 would be required to transcode call setup message 50 and transcoding information 60 indicates that call setup message 50 has already been transcoded a predetermined maximum number of times. This may limit unnecessary transcoding of call setup messages 50. Similarly, where transcoding information 60 includes a list of previous protocols into which call message has been transcoded, gateway 40 may be able to determine a more appropriate path for related call setup messages 50 to minimize the transcoding of media associated with the related call setup messages 50.

Figure 2:
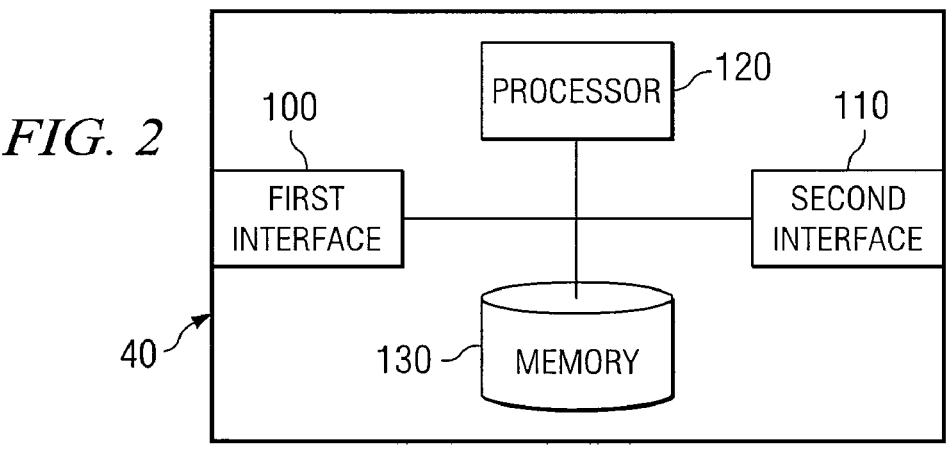
FIG. 2 is a block diagram illustrating a gateway operable to transmit messages between networks coupled to the gateway.

FIG. 2 is a block diagram illustrating components of a gateway 40 in a particular embodiment. Gateway 40 includes a first interface 100, a second interface 110, a processor 120, and a memory 140. Gateway 40 facilitates communication between networks 30 and/or devices 20 coupled to first interface 100 and second interface 110 utilizing one or more signaling protocols and one or more encoding formats. The illustrated embodiment shows gateway 40 coupled to a first network 130*a* and second network 130*b*. First network 130*a* and second network 130*b* represent particular embodiments of the components referred to generally as "networks 30" in FIG. 1.

First interface 100 and second interface 110 each provide for communication between gateway 40 and a particular network 30 or device 20 coupled to first interface 100 or second interface 110. In the illustrated embodiment, first interface 100 is capable of communicating call setup messages 50 to first network 130*a* according to at least one signaling protocol and of transmitting media to the first network 130*a* in at least one encoding format supported by first network 130*a*. Similarly, in the illustrated embodiment, second interface 110 is capable of communicating call setup messages 50 to second network 130*b* according to at least one signaling protocol and of transmitting media to second network 130*b* in at least one encoding format supported by second network 130*b*. First interface 100 and second interface 110 include any appropriate combination of hardware and/or software, including controlling logic, for carrying out the functions described below. Although the discussion below assigns particular functions to first interface 100 and second interface 110 for purposes of illustration, first interface 100 and second interface 110 may be interchangeable. Thus, in particular circumstances and/or in particular embodiments, the roles described below for first interface 100 and second interface 110 may be reversed.

Processor 120 determines whether gateway 40 will transcode media associated with call setup message 50 when gateway 40 transmits the media between first interface 100 and second interface 110. Additionally, processor 120 modifies transcoding information 60 of call setup message 50 if processor 120 determines gateway 40 will transcode the media. Processor 120 may be a dedicated microprocessor, or other processing device capable of communicating electronic information. Examples of processor 120 include application-specific integrated circuits (ASICs), field-programmable gate arrays (FPGAs), digital signal processors (DSPs) and any other suitable specific- or general-purpose processors.

Memory 140 may store computer code utilized by processor 120, a list of peer connections for various networks 30 coupled to gateway 40, information indicating which protocols the networks 30 coupled to gateway 40 support, or any other suitable information used in the operation of gateway 40. Memory 140 may comprise any collection and arrangement of volatile or non-volatile, local or remote devices suitable for storing data, such as random access memory (RAM) devices, read only memory (ROM) devices, magnetic storage devices, optical storage devices, or any other suitable data storage devices.

In operation, gateway 40 receives a call setup message 50 on first interface 100. Processor 120 determines whether gateway 40 will transcode media from a media session associated with call setup message 50 when the media crosses gateway 40 in traveling the path established by call setup message 50. Processor 120 may determine, for any appropriate reason, that gateway 40 will transcode the media. For example, if first network 130a and second network 130b do not support any common encoding formats, processor 120 may determine that gateway 40 will transcode the media simply because transcoding will be required to communicate the media between first network 130a and second network 130b. Under other circumstances, processor 120 may determine that the media will be transmitted more cheaply using a particular encoding format and that gateway 40 should transcode the media as a result. In general, processor 120 may determine that gateway 40 will transcode the media based on available formats, signal quality requirements, cost concerns, service agreements, or any other appropriate factors. In doing so, processor 120 may utilize information contained in call setup message 50, data stored in memory 140, information received through interaction with first network 130a and/or second network 130b, or information obtained from any other suitable source.

Additionally, some or all of the criteria used by gateways 40 may be established by an operator of system 10, and all gateways 40 in system 10 may operate uniformly. Alternatively, processors 120 of the various gateways 40 in system 10 may be configured individually so that various gateways 40 in system 10 may determine whether to transcode based on different factors or may utilize the factors in different ways. For example, system 10 may include components operated by different service providers. In such an embodiment, the various gateways 40 may be configured to determine whether to transcode the media based on cost considerations, existing service agreements, quality requirements, and/or any other factor specific to that service provider.

If processor 120 determines that gateway 40 will transcode the media, processor 120 modifies transcoding information 60 associated with call setup message 50 in a suitable manner based on the configuration and characteristics of system 10. FIG. 3 below provides greater detail on this process. After any appropriate modification of transcoding information 60, processor 120 transmits call setup message 50 to second interface 110 for transmission to second network 130b.

FIG. 3 illustrates operation of a particular embodiment of system 10 in communicating a call setup message 50 from device 20a to device 20b. Call setup message 50 in the illustrated embodiment includes transcoding information 60 which maintains a count of the number of times the media associated with call setup message 50 will be transcoded in traveling the path established by call setup message 50. Each network 30 of the illustrated system 10 supports a particular encoding format which is listed within the figure for that network 30. For example, network 30a supports a hypothetical encoding format referred to as "Format A."

Although, as noted above, each gateway 40 may be configured individually, gateways 40 in the illustrated embodiment are all assumed to share a common configuration for the purposes of this example. Specifically, each gateway 40 is configured to reject call setup message 50 if call setup message 50 has already crossed a predetermined maximum number of transcoding points and gateway 40 determines that gateway 40 would transcode the media. In the illustrated embodiment is this predetermined maximum is set to three times for all gateways 40.

For this example, a user of calling device 20a places a call to called device 20b. Calling device 20a generates call setup message 50 according to a protocol supported by network 30a and initializes transcoding information 60 of call setup message 50 to a value of "0". Calling device 20a also determines that the media associated with call setup message 50 will initially be encoded using a particular encoding format, in this case Format A. Calling device 20a may include information identifying the initial encoding format in call setup message 50 or may communicate this information independently to the particular network 30 or gateway 40 that calling device 20a sends call setup message 50. Calling device 20a communicates call setup message 50 to network 30a. Based on conventional routing procedures, proprietary routing policies implemented by a carrier operating network 30a, or any other appropriate routing techniques, network 30a routes call setup message 50 to one of the gateways 40 in an attempt to direct call setup message 50 towards called device 20b. In the example illustrated, this results in network 30a transmitting call setup message 50 to gateway 40a.

Gateway 40a receives call setup message 50 from network 30a. Because network 30b does not support Format A, gateway 40a determines that gateway 40 will transcode the media associated with call setup message 50 in transmitting the media through network 30b. Based on the configuration of the illustrated embodiment, gateway 40a determines whether the current value of transcoding information 60 of call setup message 50, "0", is less than the predetermined maximum. Because the value of transcoding information 60 is less than the predetermined maximum, gateway 40a determines that gateway 40a will serve as a transcoding point, transcoding the media to Format B. Thus, gateway 40b increments a counter in transcoding information 60 to a value of "1" and transmits call setup message 50 to network 30b.

This process is repeated as call setup message 50 moves through system 10 towards called device 20b. Network 30b transmits call setup message 50 to gateway 40b. Because network 30c does not support Format B, gateway 40b determines transcoding of the media associated with call setup message 50 will be necessary to transmit the media through network 30c. Based on the configuration of system 10 and gateways 40, gateway 40b determines whether the current value of transcoding information 60 of call setup message 50, "1", is less than the predetermined maximum. Because the value of transcoding information 60 is less than the predetermined maximum, gateway 40b determines that gateway 40b will serve as a transcoding point, transcoding the media to Format C. Thus gateway 40b increments a counter in transcoding information 60 to a value of "2" and transmits call setup message 50 to network 30c.

Network 30c transmits call setup message 50 to gateway 40c. Because network 30d does not support Format C, gateway 40c determines transcoding of the media associated with call setup message 50 will be necessary to transmit the media through network 30d. As a result of the transcoding limit implemented in the illustrated embodiment, gateway 40c determines whether the current value of transcoding information 60 of call setup message 50, "2", is less than the predetermined maximum. Because the value is less than the predetermined maximum, gateway 40c determines that gateway 40c will serve as a transcoding point, transcoding the media to Format D. Thus gateway 40c increments a counter in transcoding information 60 to a value of "3" and transmits call setup message 50 to network 30d.

Network 30d transmits call setup message 50 to gateway 40d. Because network 30e does not support Format D, gateway 40d once again determines that transcoding of the media associated with call setup message 50 will be necessary to transmit the media through network 30e. As a result of the transcoding limit implemented in the illustrated embodiment, gateway 40d determines whether the current value of transcoding information 60 of call setup message 50, "3", is less than the predetermined maximum. Because the value of transcoding information 60 now equals the predetermined maximum value of "3", gateway 40d determines that gateway 40d should not transcode the media. As a result, gateway 40 may take appropriate remedial steps. The illustrated embodiment is configured so that gateway 30d transmits call setup message 50 back to network 30d for routing through a different gateway 40 coupled to network 30d. In particular, after having call setup message 50 returned, network 30d transmits call setup message 50 to gateway 40e. Because network 30f supports Format D, gateway 40e determines that gateway 40e will not transcode the media and transmits call setup message 50 to network 30f without modifying transcoding information 60.

Network 30f transmits call setup message 50 to gateway 40f. Because network 30g supports Format D, gateway 40f determines that gateway 40f will not transcode the media and transmits call setup message 50 to network 30g without modifying transcoding information 60. Network 30g then transmits call setup message 50 to gateway 40g. Because network 30h also supports Format D, gateway 40g determines that gateway 40g will not transcode the media and transmits call setup message 50 to network 30h without modifying transcoding information 60. Network 30h then communicates call setup message 50 to called device 20b in an appropriate manner.

Although the above description illustrates transcoding information 60 that provides specific information about the transcoding that will occur to media traversing the path established by call setup message 50, system 10 can be configured to utilize transcoding information 60 that records any suitable information about transcoding along the path or about the formats supported by networks 30 along the path. Additionally, notwithstanding the specific use of transcoding information 60 by system 10 illustrated in FIG. 3, system 10 can be configured to use transcoding information 60 in any suitable manner. For example, instead of unconditionally rejecting call setup message 50 when a particular gateway 40 determines that transcoding will occur but the counter in transcoding information 60 has already reached the maximum value, gateway 40 may be configured to consider the value of counter in transcoding information 60 as a weighted factor along with, for example, quality of service, overall transmission time, and/or network traffic, in determining whether gateway 40 will transcode the media. Moreover, with more detailed transcoding information 60, system 10 or its components may request networks 30 to utilize commonly supported formats, pick better intermediate paths, or otherwise provide more intelligent routing.

While FIG. 3 illustrates particular functions being performed by particular components of this embodiment, in a particular embodiment the functions carried out by the various components of system 10 may be divided among the components in any appropriate manner. For example, the functions performed by gateways 40 in modifying transcoding information 60 may be incorporated into networks 30.

Figure 4:
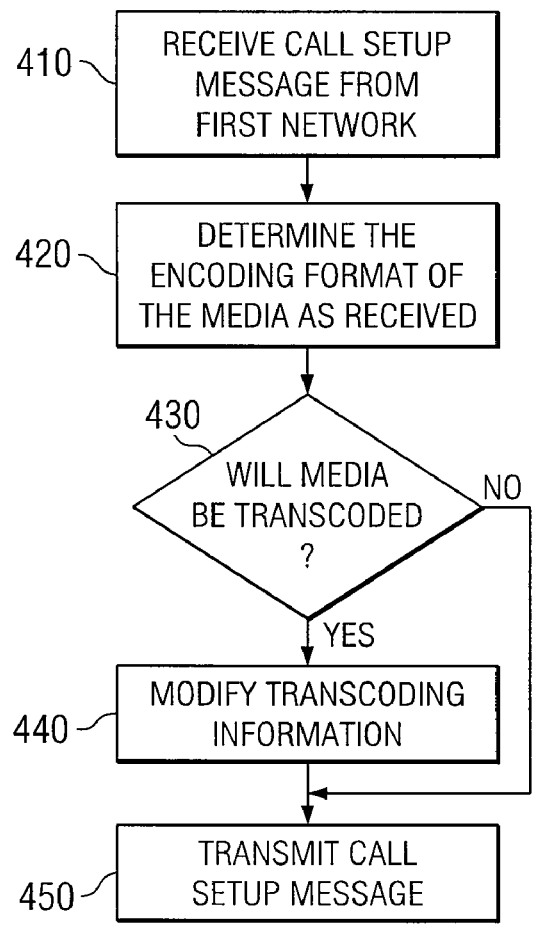
FIG. 4 is a flowchart illustrating a method for providing telephony services using the gateway.

FIG. 4 is a flow chart illustrating the operation of the particular embodiment of gateway 40 illustrated in FIGS. 2 and 3 in transmitting a call setup message 50 received by gateway 40 from first network 130a to second network 130b. This description focuses for purposes of illustration on a particular embodiment of gateway 40 configured to accept, modify, and utilize a particular type of transcoding information 60 in a particular fashion. Nonetheless, as described above, various embodiments of system 10 may include gateways 40 using any suitable form of transcoding information 60 in any suitable fashion.

At step 410, gateway 40 receives from first network 130a coupled to gateway 40 a call setup message 50 establishing a path for a media session associated with the call setup message 50. At step 420, gateway 40 determines the encoding format that the media will have at the point on the path when gateway 40 receives the media. Gateway 40 determines whether gateway 40 will transcode the media at step 430 based on, for example, encoding formats supported by second network 130b, signal quality requirements, cost considerations, service agreements, the contents of transcoding information 60, and/or any other suitable factors.

If gateway 40 determines that gateway 40 will not transcode the media, then gateway 40 transmits call setup message 50 to the second network 30 without modifying transcoding information 60 at step 450. If gateway 40 determines that gateway 40 will transcode the media, gateway 40 modifies transcoding information 60 associated with call setup message 50 to document the transcoding at step 440. At step 450, gateway 40 transmits call setup message 50 with the modified transcoding information 60 to the second network 130b.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for providing telecommunication service between a plurality of users, comprising:
a first network operable to communicate media in at least one encoding format;
a second network operable to communicate media in at least one encoding format;
a gateway, operable to:
  receive a call setup message from the first network, the call setup message signaling for a media channel for transporting media between a first device and a second device;
  identify a first encoding format for the media communicated with the first network;
  determine a second encoding format for the media communicated with the second network;
  if the first encoding format and the second encoding format are different:
    determine whether a count included in the call setup message is greater than a predetermined value, wherein the count indicates a number of transcoding points on the media channel;
    in response to determining that the count is greater than the predetermined value, reject the call setup message; and
    in response to determining that the count is not greater than the predetermined value:
      increment the count;
      identify a remote element to receive the call setup message; and
      transmit the call setup message to the remote element.

2. The system of claim 1, wherein the gateway is further operable to modify the transcoding information in the call setup message by incrementing a counter value of the transcoding information.

3. The system of claim 1, wherein the gateway is further operable to modify the transcoding information in the call setup message by appending information identifying an encoding format to the transcoding information.

4. The system of claim 1, wherein the gateway is further operable to determine the second encoding format based on at least the transcoding information in the call setup message.

5. The system of claim 1, wherein the gateway is further operable to determine the second encoding format based on at least whether a counter value of the transcoding information is less than a predetermined maximum.

6. The system of claim 1, wherein the gateway is further operable to determine the second encoding format based on a cost associated with the second format.

7. The system of claim 1, wherein the gateway is further operable to identify the remote element to receive the call setup message based on at least the transcoding information.

8. The system of claim 1, wherein the gateway is further operable to identify the remote element to receive the call setup message based on at least whether a counter value of the transcoding information is less than a predetermined maximum.

9. A method for signaling to establish telecommunication service between a first and a second network comprising:
   receiving a call setup message from a first network, the call setup message signaling for a media channel for transporting media between a first device and a second device;
   identifying a first encoding format for media in the media channel communicated with the first network;
   determining a second encoding format for media in the media channel communicated with a second network;
   if the first encoding format and the second encoding format are different:
      determining whether a count included in the call setup message is greater than a predetermined value, wherein the count indicates a number of transcoding points on the media channel;
      in response to determining that the count is greater than the predetermined value, rejecting the call setup message; and
      in response to determining that the count is not greater than the predetermined value:
      incrementing the count;
      identifying a remote element to receive the call setup message; and
      transmitting the call setup message to the remote element.

10. The method of claim 9, wherein modify the transcoding information in the call setup message comprises incrementing a counter value of the transcoding information.

11. The method of claim 9, wherein modifying the transcoding information in the call setup message comprises appending information identifying an encoding format to the transcoding information.

12. The method of claim 9, wherein determining the second encoding format comprises determining a second encoding format based on at least the transcoding information in the call setup message.

13. The method of claim 9, wherein determining the second encoding format comprises determining a second encoding format based on at least whether a counter value in the transcoding information is less than a predetermined maximum.

14. The method of claim 9, wherein determining the second encoding format comprises determining a second encoding format based on a cost associated with the second format.

15. The method of claim 9, wherein identifying the remote element to receive the call setup message comprises identifying a remote element to receive the call setup message based on at least the transcoding information.

16. The method of claim 9, wherein identifying the remote element to receive the call setup message comprises identifying a remote element to receive the call setup message based on at least whether the a counter value of the transcoding information is less than a predetermined maximum.

17. A device for facilitating communication between a first network and a second network in a telecommunication system, comprising:
   a first interface, operable to communicate with a first network and operable to receive a call setup message, the call setup message signaling for a media channel for transporting media between a first device and a second device;
   a second interface, operable to communicate with a second network;
   a processor operable to:
      identify a first encoding format for the media communicated with the first network;
      determine a second encoding format for the media communicated with the second network;
      if the first encoding format and the second encoding format are different:
         determine whether a count included in the call setup message is greater than a predetermined value, wherein the count indicates a number of transcoding points on the media channel;
         in response to determining that the count is greater than the predetermined value, reject the call setup message; and
         in response to determining that the count is not greater than the predetermined value:
         increment the count;
         identify a remote element to receive the call setup message; and
         transmit the call setup message to the remote element using the second interface.

18. The device of claim 17, wherein the processor is further operable to modify the transcoding information in the call setup message by incrementing a counter value of the transcoding information.

19. The device of claim 17, wherein the processor is further operable to modify the transcoding information in the call setup message by appending information identifying an encoding format to the transcoding information.

20. The device of claim 17, wherein the processor is further operable to determine the second encoding format based on at least the transcoding information in the call setup message.

21. The device of claim 17, wherein the processor is further operable to determine the second encoding format based on at least whether a counter value of the transcoding information is less than a predetermined maximum.

22. The device of claim 17, wherein the processor is further operable to determine the second encoding format based on a cost associated with the second format.

23. The device of claim 17, wherein the processor is further operable to identify the remote element to receive the call setup message based on at least the transcoding information.

24. The device of claim 17, wherein the processor is further operable to identify the remote element to receive the call setup message based on at least whether a counter value of the transcoding information is less than a predetermined maximum.

25. A computer program stored on a computer readable medium, the computer program operable to:
- receive a call setup message from a first network, the call setup message signaling for a media channel for transporting media between a first device and a second device;
- identify a first encoding format for media in the media channel communicated with the first network;
- determine a second encoding format for media in the media channel communicated with a second network;
- if the first encoding format and the second encoding format are different:
  - determine whether a count included in the call setup message is greater than a predetermined value, wherein the count indicates a number of transcoding points on the media channel;
  - in response to determining that the count is greater than the predetermined value, reject the call setup message; and
  - in response to determining that the count is not greater than the predetermined value:
    - increment the count;
    - identify a remote element to receive the call setup message; and
    - transmit the call setup message to the remote element.

26. The computer program of claim 25, wherein the computer program is further operable to modify the transcoding information in the call setup message by incrementing a counter value of the transcoding information.

27. The computer program of claim 25, wherein the computer program is further operable to modify the transcoding information in the call setup message by appending information identifying an encoding format to the transcoding information.

28. The computer program of claim 25, wherein the computer program is further operable to determine the second encoding format based on at least the transcoding information in the call setup message.

29. The computer program of claim 25, wherein the computer program is further operable to determine the second encoding format based on at least whether a counter value in the transcoding information is less than a predetermined maximum.

30. The computer program of claim 25, wherein the computer program is further operable to determine the second encoding format based on a cost associated with the second format.

31. The computer program of claim 25, wherein the computer program is further operable to identify the remote element to receive the call setup message based on at least the transcoding information.

32. The computer program of claim 25, wherein the computer program is further operable to identify the remote element to receive the call setup message based on at least whether the a counter value of the transcoding information is less than a predetermined maximum.

33. A system for providing telecommunication service between a plurality of users, comprising:
- means for receiving a call setup message from a first network, the call setup message signaling for a media channel for transporting media between a first device and a second device;
- means for identifying a first encoding format for media in the media channel communicated with the first network;
- means for determining a second encoding format for media in the media channel communicated with a second network;
- means for determining whether the first encoding format and the second encoding format are different;
- means for determining whether a count included in the call setup message is greater than a predetermined value if the first encoding format and the second encoding format are different;
- means for rejecting the call setup message in response to determining that the count is greater than the predetermined value; and
- means for incrementing the count in response to determining that the count is not greater than the predetermined value;
- means for identifying a remote element to receive the call setup message; and
- means for transmitting the call setup message to the remote element.

* * * * *